United States Patent
Hashimoto

(10) Patent No.: US 10,580,168 B2
(45) Date of Patent: Mar. 3, 2020

(54) CONTENT OUTPUT SYSTEM AND METHOD

(71) Applicant: HONDA MOTOR CO., LTD., Tokyo (JP)

(72) Inventor: Masayuki Hashimoto, Saitama (JP)

(73) Assignee: HONDA MOTOR COL, LTD., Tokyo (JP)

( * ) Notice: Subject to any disclaimer, the term of this patent is extended or adjusted under 35 U.S.C. 154(b) by 0 days.

(21) Appl. No.: 15/622,289

(22) Filed: Jun. 14, 2017

(65) Prior Publication Data
US 2017/0372500 A1 Dec. 28, 2017

(30) Foreign Application Priority Data
Jun. 23, 2016 (JP) .................. 2016-124994

(51) Int. Cl.
*G06T 11/00* (2006.01)
*H04W 4/029* (2018.01)
(Continued)

(52) U.S. Cl.
CPC .......... *G06T 11/00* (2013.01); *G06K 9/00711* (2013.01); *H04W 4/02* (2013.01); *H04W 4/029* (2018.02)

(58) Field of Classification Search
CPC ..... G06T 11/60; G06T 11/00; G06K 9/00711; H04W 4/02; H04W 4/029
(Continued)

(56) References Cited

U.S. PATENT DOCUMENTS

2003/0036848 A1* 2/2003 Sheha ................ G01C 21/3679
701/468
2010/0287485 A1* 11/2010 Bertolami ............... G06F 3/011
715/764
(Continued)

FOREIGN PATENT DOCUMENTS

| JP | 2002-092028 A | 3/2002 |
| JP | 2004-286872 A | 10/2004 |

(Continued)

OTHER PUBLICATIONS

Japanese Office Action corresponding to JP Appln. No. 2016-124994, dated Nov. 5, 2019.

*Primary Examiner* — Ke Xiao
*Assistant Examiner* — Kim Thanh T Tran
(74) *Attorney, Agent, or Firm* — Squire Patton Boggs (US) LLP

(57) ABSTRACT

An information output system is provided which allows a user to recognize information appropriately while reducing or eliminating inconvenience given to the user. A content output system includes a content output controller 213 which selects output candidate content on the basis of the movement mode of the user and the content position, causes an output unit 25 to output supplementary information on the output candidate content when the relative positional relationship between the user and the output candidate content satisfies a predetermined first condition, and causes the output unit 25 to output the output candidate content when the relative positional relationship between the user and the output candidate content satisfies a predetermined second condition.

3 Claims, 9 Drawing Sheets

(51) Int. Cl.
*G06K 9/00* (2006.01)
*H04W 4/02* (2018.01)

(58) Field of Classification Search
USPC .......................................... 345/633
See application file for complete search history.

(56) References Cited

U.S. PATENT DOCUMENTS

| | | | | |
|---|---|---|---|---|
| 2012/0069052 | A1* | 3/2012 | Lee | G06F 1/1694 |
| | | | | 345/633 |
| 2012/0105476 | A1* | 5/2012 | Tseng | G01C 21/3611 |
| | | | | 345/633 |
| 2012/0148106 | A1* | 6/2012 | Sung | G06T 19/006 |
| | | | | 382/106 |
| 2012/0194554 | A1* | 8/2012 | Kaino | G08B 13/19613 |
| | | | | 345/633 |
| 2013/0044128 | A1* | 2/2013 | Liu | G09G 5/00 |
| | | | | 345/633 |
| 2015/0198458 | A1* | 7/2015 | Suzuki | H04W 4/046 |
| | | | | 701/439 |

FOREIGN PATENT DOCUMENTS

| | | |
|---|---|---|
| JP | 2009-216584 A | 9/2009 |
| JP | 2012-078224 A | 4/2012 |
| JP | 2012-216072 A | 11/2012 |
| JP | 2014-074670 A | 4/2014 |
| JP | 2015-133011 A | 7/2015 |

\* cited by examiner

FIG.3

| CONTENT ID 1221 | CONTENT POSITION 1222 | TITLE 1223 | IMAGE 1224 | THE NUMBER OF EVALUATORS 1225 | LOCATOR 1226 |
|---|---|---|---|---|---|
| Y1 | L1 | MAGIC SHOW | NONE | 32000 | http://xx |
| Y2 | L2 | OOOOO'S CAMPAIGN SPEECH | http://OO | 45000 | http://xx |
| Y3 | L3 | OPEN AIR CONCERT | http://OO | 38000 | http://xx |
| ... | ... | ... | ... | ... | http://xx |
| Ym | Lm | PERFORMANCE | http://OO | 25000 | http://xx |

|     | Y1   | Y2   | Y3   | ... | Ym   |
|-----|------|------|------|-----|------|
| X0  | 1    | 0    | 1    | ... | Null |
| X1  | 1    | Null | 1    | ... | Null |
| X2  | 0    | Null | Null | ... | Null |
| X3  | 1    | 0    | 0    | ... | 1    |
| ... | ...  | ...  | ...  | ... | ...  |
| Xn  | Null | 1    | 1    | ... | 1    |

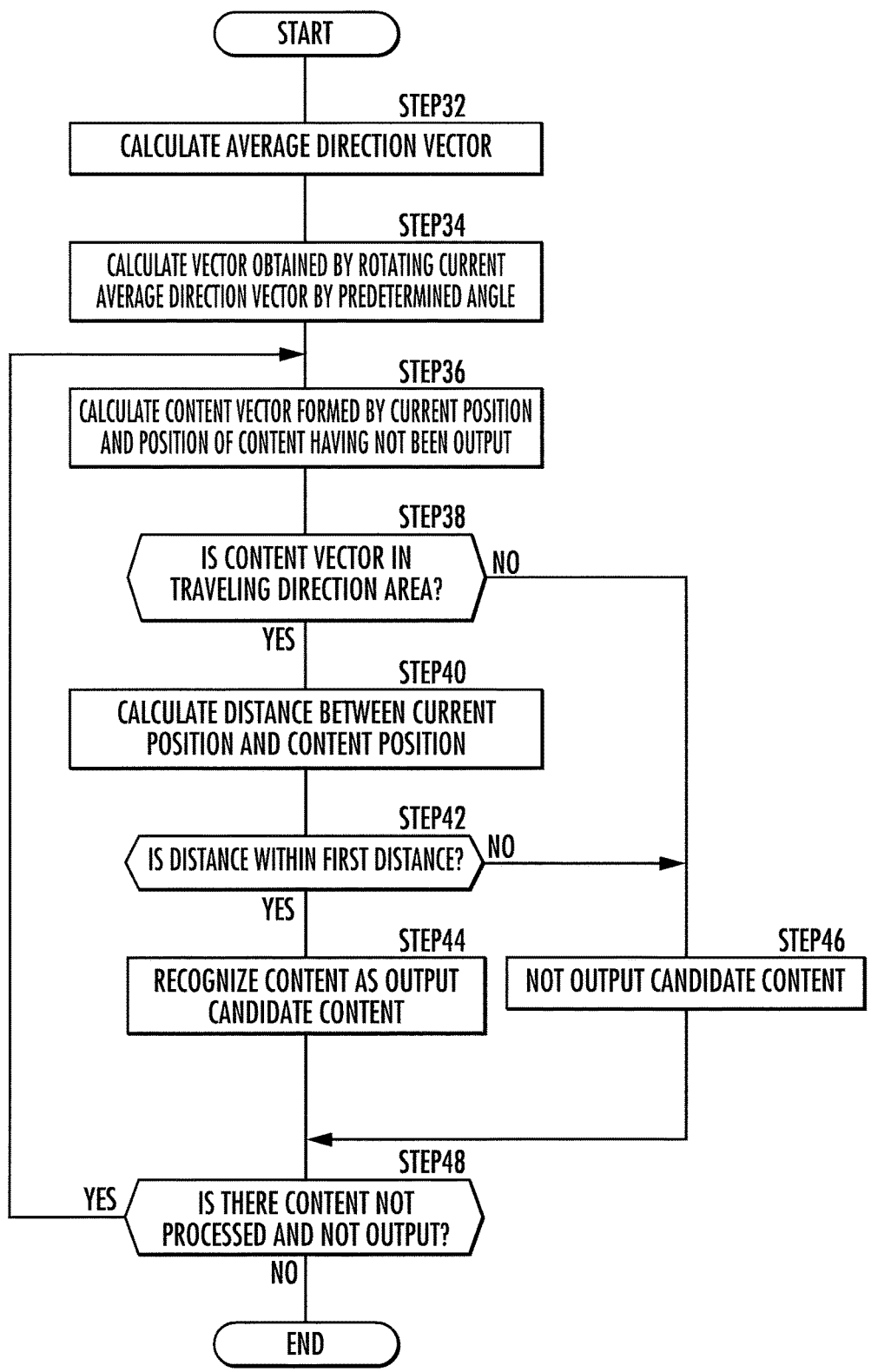

CONTENT OUTPUT SYSTEM AND METHOD

BACKGROUND OF THE INVENTION

Field of the Invention

The present invention relates to a content output system and method.

Description of the Related Art

Conventionally, systems which output content related to a position have been known.

For example, a technique has been proposed that displays a post icon corresponding to obtained post information on a map in an overlapping manner on the basis of the obtained post information and a posting position associated with the post information, and outputs the post information when the distance between the position of a vehicle and the posting position becomes within a predetermined distance (see Japanese Patent Laid-Open No. 2015-133011).

The technique of Japanese Patent Laid-Open No. 2015-133011 displays, together with the post icon, the type of or detailed information on the post information corresponding to the post icon on the map in the overlapping manner.

In a case where the post information is first displayed only after the distance between the position of the vehicle and the posting position becomes within the predetermined distance, if the post information is much different from the expectation of a user, it may dissatisfy the user.

Meanwhile, there is a possibility that the technique described in Japanese Patent Laid-Open No. 2015-133011 displays an enormous amount of detailed information on the map. According to such display, it is difficult for the user to recognize the detailed information on each of pieces of map information or the post information. Alternatively, a configuration is also assumed that displays the type and details of the post information when the post icon is clicked. In a case where operation is difficult, such as a case of vehicle driving, the configuration may give inconvenience to the user.

The present invention has thus an object to provide a content output system and method which allow the user to recognize information appropriately while reducing or eliminating inconvenience which is to be given to the user.

SUMMARY OF THE INVENTION

A content output system of the present invention includes:
an output unit configured to output information;
a user state recognizing unit configured to recognize a position of a user;
a content recognizing unit configured to recognize a content, a content position which is a position associated with the content, and supplementary information which contains at least one of a title of the content, an image contained in the content, a distance between the position of the user and the content position, and an evaluation for the content; and
content output controller configured to
   select output candidate content which is a candidate of content to be output, based on a movement mode of the user and the content position,
   output the supplementary information on the output candidate content, in a case where a relative positional relationship between the user and the output candidate content satisfies a predetermined first condition, and
   cause the output unit to output the output candidate content, in a case where the relative positional relationship between the user and the output candidate content satisfies the first condition and subsequently the relative positional relationship between the user and the output candidate content satisfies a predetermined second condition.

According to the content output system of the present invention, the supplementary information on the output candidate content is output, in a case where the relative positional relationship between the user and the content satisfies the predetermined first condition. The output candidate content is output when the relative positional relationship between the user and the content satisfies the predetermined second condition after the first condition is satisfied.

Thus, the user is allowed to recognize the supplementary information on the output candidate content before the output candidate content is output. The supplementary information is information related to the output candidate content. Consequently, the user is allowed to recognize the overview of the output candidate content roughly.

If the user is not interested in the supplementary information, there is a relatively higher probability that the user does not want the output candidate content to be output and that the state where the second condition is unsatisfied is maintained. If the state where the second condition is unsatisfied is maintained, the output candidate content is not output. Consequently, output of the output candidate content having a relatively high probability that the usefulness for the user is low, can be avoided.

If the user is interested in the supplementary information, there is a relatively higher probability that the user moves so as to satisfy the second condition for the sake of outputting the output candidate content. When the second condition is satisfied, the output candidate content having a relatively high probability that the usefulness for the user is high, is output.

The supplementary information is supplementary information on the output candidate content which has been selected by the content output controller and can be output. When the positional relationship between the output candidate content and the user satisfies the first condition, the supplementary information is output.

In other words, the pieces of supplementary information on all the pieces of content are not output at a time. After a piece of content is selected as a piece of output candidate content, the piece of supplementary information is successively displayed.

Thus, output of an enormous amount of information at a time is avoided without need of any operation by the user. As a result, the user is allowed to recognize the content appropriately while the inconvenience of the user is reduced or eliminated.

According to the content output system having such a configuration, what contains at least one of the title of the content, an image contained in the content, the distance between the position of the user and the content position, and the evaluation for the content is output as the supplementary information.

Thus, the user is allowed to recognize an item in which the user tends to be interested without any operation by the user. Consequently, the inconvenience to be given to the user is reduced or eliminated.

In the content output system of the present invention, it is further preferable that the supplementary information should be information extracted from the content.

According to the content output system having such a configuration, the information extracted from the content in the case where the first condition is satisfied is output. Consequently, the user is allowed to recognize roughly a more correct overview of the output candidate content.

In the content output system of the present invention, it is preferable that the content output controller should estimate a movement direction of the user, based on time-series positions of the user, and select the output candidate content which is a candidate of content to be output, based on the movement direction of the user and the content position.

According to the content output system of the present invention, output candidate content which is appropriate with respect to the movement direction of the user and the content position can be selected.

In the content output system of the present invention having such a configuration, it is preferable that in a case where an area in a predetermined direction with respect to the movement direction of the user contains the content position, the content output controller should select content corresponding to the content position as the output candidate content.

According to the content output system of the present invention having such a configuration, when the content position is contained in an area in a predetermined direction with respect to the movement direction of the user, that is, an area having a high probability that the user visits the area, the content corresponding to the content position is selected as the output candidate content.

A content output system of the present invention includes: an output unit configured to output information; a user state recognizing unit configured to recognize a position of a user; a content recognizing unit configured to recognize content, a content position which is a position associated with the content, and an evaluation by the user for the content; and a content output controller configured to select content to be output, based on a positional relationship between the user and the content, and an evaluation of a user different from the user for each piece of content.

According to the content output system having such a configuration, the content to be output is selected in consideration not only of the positional relationship between the user and the content but also an evaluation by another user. Thus, the user is allowed to recognize the content appropriately while inconvenience which is to be given to the user is reduced or eliminated.

In the content output system having such a configuration, it is preferable that the content output controller should select a piece of content to be output, among pieces of content having not been output to the user, based on a similarity between an evaluation tendency by the user and an evaluation tendency by another user, and the evaluation by the other user for the pieces of content having not been output.

According to the content output system having such a configuration, even content having not been output to the user is selected as content to be output, in consideration not only of the evaluation by the other user for the content having not been output but also of the similarity between the evaluation tendency by the user and the evaluation tendency by the other user. Consequently, appropriate content can be selected in view of the evaluation tendency by the user.

In the content output system having such a configuration, it is preferable that the content output controller should output a piece of content having a high evaluation by a related user having a designated relationship with the user, among pieces of content having not been output to the user, with a higher priority than pieces of content of which the evaluation is low.

It is estimated that the user tends to be interested in the content having a high evaluation by a related user having a designated relationship. According to the content output system having such a configuration, even content having not been output to the user can be output with a higher priority if the content has a high probability that the user is interested in the content.

In the content output system having such a configuration, it is preferable that the content recognizing unit should recognize a position where the content is obtained, as the content position, and the content output controller should output a piece of content where the position of the user and the content position should be near to each other, with a higher priority than a piece of content where the position of the user and the content position should be far from each other.

According to the content output system having such a configuration, the content obtained at a position near to the position of the user is output with a higher priority.

In the content output system according to the present invention, the first condition is a condition that the content position is included in a first area within a predetermined distance from the position of the user.

In the content output system according to the present invention, the second condition is a condition that the content position is included in a second area in an orientation defined by a traveling direction of the user.

A content output method of the present invention is a method executed by a system comprising an output unit configured to output information, the method including: a user state recognizing step of recognizing a position of a user; a content recognizing step of recognizing a content, a content position which is a position associated with the content, and supplementary information which contains at least one of a title of the content, an image contained in the content, a distance between the position of the user and the content position, and an evaluation for the content; an output candidate content selection step of selecting output candidate content which is a candidate of content to be output, based on a movement mode of the user and the content position; a supplementary information output step of outputting the supplementary information on the output candidate content, in a case where a relative positional relationship between the user and the output candidate content satisfies a predetermined first condition; and content output step of causing the output unit to output the output candidate content, in a case where the relative positional relationship between the user and the output candidate content satisfies the first condition and subsequently the relative positional relationship between the user and the output candidate content satisfies a predetermined second condition.

BRIEF DESCRIPTION OF THE DRAWINGS

FIG. 3 is a diagram illustrating content information;
FIG. 4 is a diagram illustrating evaluation information;
FIG. 9 is a flowchart of an output candidate content recognizing process.

DETAILED DESCRIPTION OF THE PREFERRED EMBODIMENTS (Configuration of Server and Client System)

Figure 1:
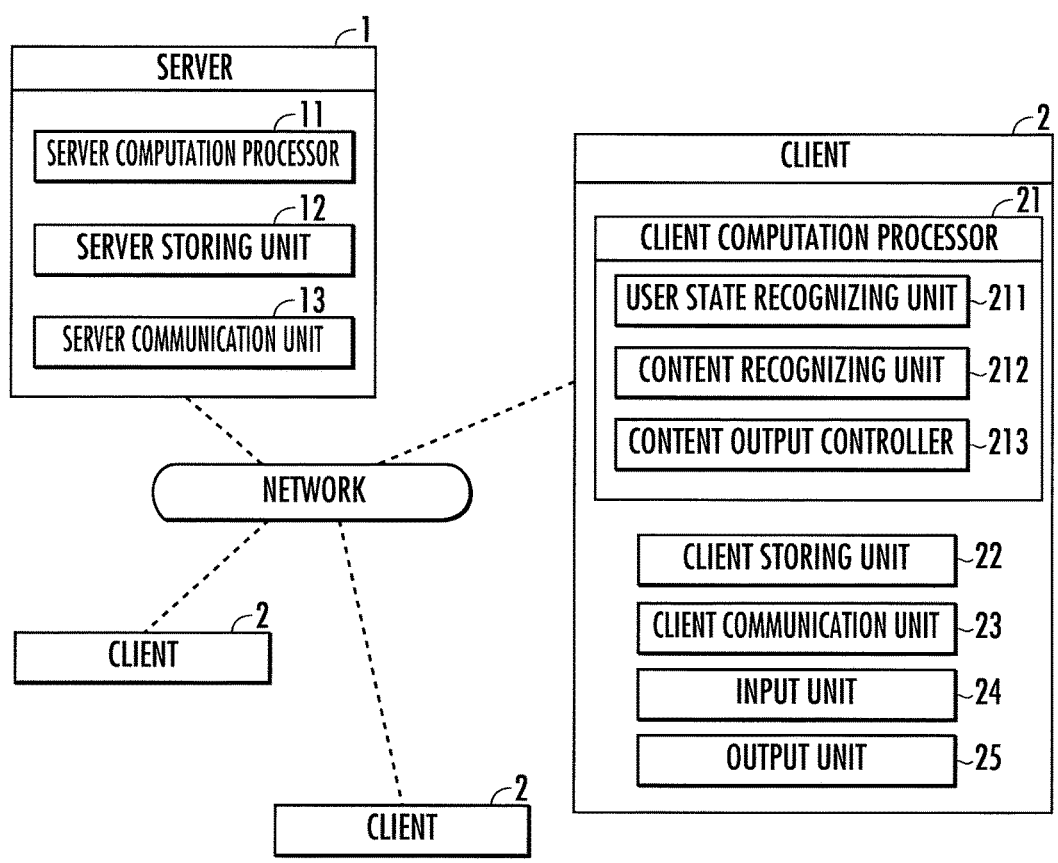
FIG. 1 is an overall configuration diagram of a content output system.

A content output system shown in FIG. 1 which is an embodiment of the present invention comprises a server 1, and a plurality of clients 2, which serve as mobile stations. The server 1 and the clients 2 can communicate with each other via one or more networks. The client 2 is configured by an information terminal carried by a user. The client 2 may be temporarily or permanently mounted on a mobile unit which is an apparatus having a function of being moved according to a drive operation by a user and is a vehicle, such as a four-wheel automobile, a two-wheel automobile or a bicycle.

(Configuration of Server)

The server 1 is made up of a computer which serves as a fixed station, and includes a server computation processor 11, a server storing unit 12, and a server communication unit 13. The server 1 may be made up of a mobile type terminal, such as a smart phone or a tablet, serving as a mobile station.

The server computation processor 11 includes: a central processing unit (CPU) which reads software and data from a designated area of a memory constituting the server storing unit 12, as required, and executes a designated computation process for the data as a target according to the software; and a communication device, storing device (memory) and the like as required.

Figure 2:
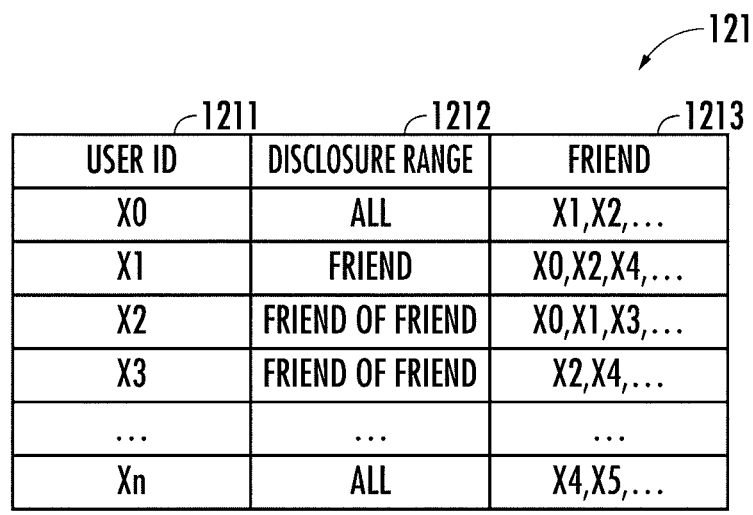
FIG. 2 is a diagram illustrating user information.

The server storing unit 12 stores user information 121 shown in FIG. 2, content information 122 shown in FIG. 3, and evaluation information 123 shown in FIG. 4.

The user information 121 is information on each user in an SNS (social networking service), and contains a user ID column 1211, a disclosed range column 1212, and a friend column 1213, as shown in FIG. 2.

The user ID column 1211 is a column for storing user IDs for identifying respective users. FIG. 2 shows Xi (i=0 to n; n is an integer of zero or more) as the user ID.

The disclosed range column 1212 is a column for storing privacy policies which indicate ranges within which pieces of content posted by users to the SNS are disclosed. FIG. 2 shows three types, or "All", "Friend", and "Friend of friend".

The friend column 1213 is a column for storing user IDs of friends of each user in the SNS.

The content information 122 is information pertaining to content posted by each user in the SNS, and contains a content ID column 1221, a content position column 1222, a title column 1223, an image column 1224, the-number-of-evaluators column 1225, and a locator column 1226, as shown in FIG. 3.

Pieces of "content" include not only pieces of content which are recognized through the sense of sight, such as pieces of text content and image content (still images and moving images), but also pieces of content which are recognized through the sense of hearing, such as pieces of audio content (pieces of music and operation sounds), and pieces of amusement content in which the pieces described above are combined.

The content ID column 1221 is a column for storing content IDs for identifying the respective pieces of content. FIG. 3 shows Yj (j=1 to m; j is a natural number) as content IDs.

The content position column 1222 is a column for storing positions associated with pieces of content, for example, content posting positions. Other examples of the positions associated with the pieces of content include positions designated by content posters, and positions determined based on details of pieces of content (positions indicated by place names contained in the content).

The title column 1223 is a column for storing the titles of pieces of content.

The image column 1224 stores the URLs (Uniform Resource Locators) of typical images of pieces of content. The typical image of piece of the content is, for example, an image designated by the content poster, or an image at the start of a moving image in a case where the content is the moving image.

The-number-of-evaluators column 1225 is a column for storing the number of users who have evaluated the content.

The locator column 1226 stores the URLs of the respective pieces of content.

As shown in FIG. 4, the evaluation information 123 is information which represents, in a matrix, the evaluations by the users for the pieces of content. The leftmost column stores the user IDs 1231. The uppermost row stores the content IDs 1232. The evaluation for each piece of content is represented in any of three levels which are 1 (positively evaluated), 0 (negatively evaluated), and Null (not output). For example, an evaluation 1233 by a user X0 for content Y1 is 1 (positively evaluated), an evaluation 1234 by the user X0 for content Y2 is 0 (negatively evaluated), and an evaluation 1235 by the user X0 for content Ym is Null (not output). When the user X0 positively evaluates the content, the evaluation for the content has a high value. When the user X0 negatively evaluates the content, the evaluation for the content has a low value.

The evaluation for content may be, for example, evaluation in multiple levels for each piece of content (e.g., evaluation in five levels). Alternatively, the evaluation for content may be some evaluations selected from among multiple types of evaluations, such as "favorite", "interesting", and "amazing".

The server storing unit 12 further stores and holds traffic information and server map information. The "traffic information" contains movement cost for each link. The "server map information" contains the position, shape, orientation and the like of each link which constitutes a road, in a set of coordinate values (latitude and longitude) or (latitude, longitude and altitude), and further contains link identification information for identifying each link, and data representing the attribute. The links are connected to each other at nodes.

The server communication unit 13 is connected to a public communication network, which is the network, and comprises a communication device which communicates with an external terminal, such as the client 2.

(Configuration of Client)

The client 2 is made up of a mobile terminal, such as a smart phone or a tablet, serving as a mobile station. For example, the "mobile type" means that the size is equivalent to the size of a standard palm of a person, and the weight is equivalent to a weight allowing the device to be carried easily by one hand or in a pocket of clothes. The client 2 may be made up of a device larger and heavier than a mobile type device (e.g., a device attached to a mobile unit).

The client 2 comprises a client computation processor 21, a client storing unit 22, a client communication unit 23, an input unit 24, and an output unit 25.

The client computation processor 21 is made up of a processor, such as a CPU (central processing unit), and reads a predetermined program from a memory or the like and executes the program, thereby functioning as a user state recognizing unit 211, a content recognizing unit 212, and a content output controller 213, which execute a computation process, described later.

The client computation processor 21 is configured to measure or detect the current position of the client 2 in a time series manner. The current position of the client 2 is measured on the basis not only of a signal received by a GPS receiver from an artificial satellite but also of an output signal of a gyro sensor as required. The client computation processor 21 is configured to transmit, to the server 1, "probe information" which represents the time-series variational mode of the position of the client 2. The client computation processor 21 is configured to detect start (IGN OFF→ON) of a mobile unit, such as a vehicle, on which the client 2 is mounted, and stop of motion (IGN ON→OFF).

The client computation processor 21 is configured to transmit "route search request" to the server 1 and receive, from the server 1, "server route information" in response to the request. The client computation processor 21 is configured to retrieve a client route on the basis of the server route information using client map information and output the retrieved route to the output unit 25.

The client storing unit 22 is configured to store and hold a computation process result, such as receipt information and a calculated result, by the client computation processor 21. The client storing unit 22 is configured to store the client map information, content and the like. The "client map information" contains, a set of coordinates which represents the positions, shapes, orientations and the like of links constituting a road, and link identification information for identifying each of the link.

The client map information is not necessarily contain the set of coordinates, and may contain image information to be output on the output unit 25, and the link identification information on the links constituting roads contained in the map. In this case, the server 1 may identify coordinate values coinciding with coordinate values contained in the probe information or request information among coordinate values contained in the server map information to thereby identify the link identification information or road type which correspond to the identified coordinate values.

Even if the client map information and the server map information have different definitions and the like of sets of coordinates in each piece of map information because of their different specifications and data structures, the links can be matched because the same link is assigned the common link identification information. The server route information containing the link identification information is transmitted by the server 1. A navigation route image including multiple links identified by the link identification information contained in the route information is displayed by the client 2 through the output unit 25.

The client storing unit 22 may store the user information 121, content information 122, and evaluation information 123 periodically downloaded from the server 1.

The client communication unit 23 is connected to a public communication network, which is the network, and comprises a communication device which communicates with an external terminal, such as the server 1.

The input unit 24 is made up of operation buttons and a microphone, and allows various operations and input setting through an operation or utterance by the user. The output unit 25 is made up of a display device and an audio output device (loudspeaker), and displays image content, such as client map information, or outputs audio content. The input unit 24 and the output unit 25 may be made up of a touch panel type display.

"Output" of information by a configuration element of the present invention means output of information in every possible form, such as display, audio output, and vibration output of the information, which can be recognized by a person through the five senses including the sense of sight, sense of hearing, and sense of touch. The configuration element of the present invention is "configured" to execute a computation process of which the element takes charge; this means that the configuration element has a function of reading a program and data required by the configuration element from the memory and then executing the corresponding computation process on the basis of the data according to the program, or is programmed as such.

(Content Output Control Process)

Referring to FIGS. 5 to 8, the content output control process is described.

Figure 6:
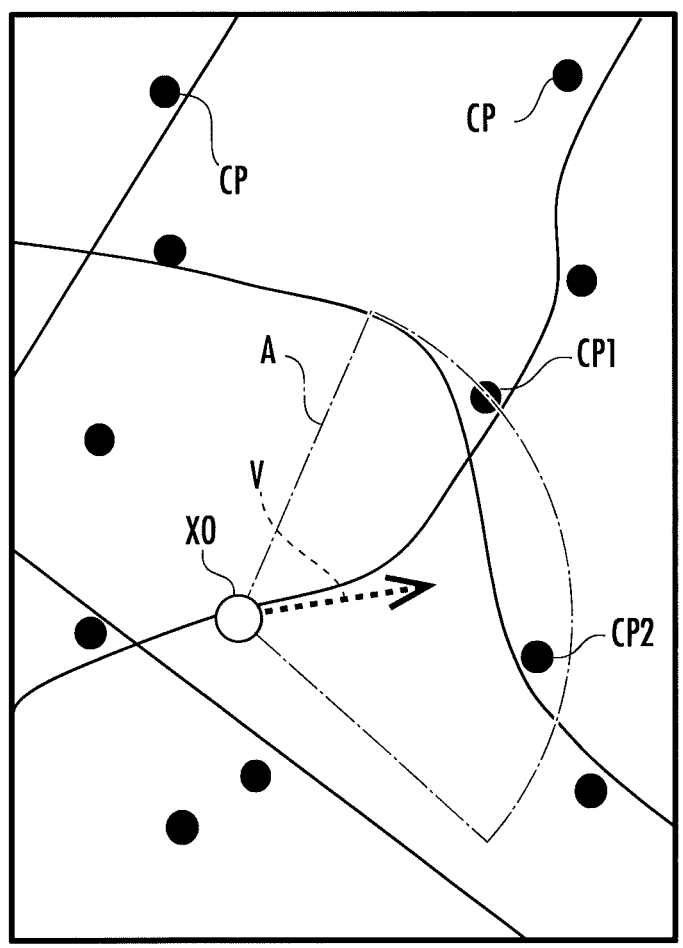
FIG. 6 is a diagram illustrating an example of surroundings of a client and content position.

The process is described assuming that a user X0 is moving in an area shown in FIG. 6 while carrying the client 2. Multiple positions (content positions CP) which are related to pieces of content and are indicated by black dots reside around the client 2.

Figure 5:
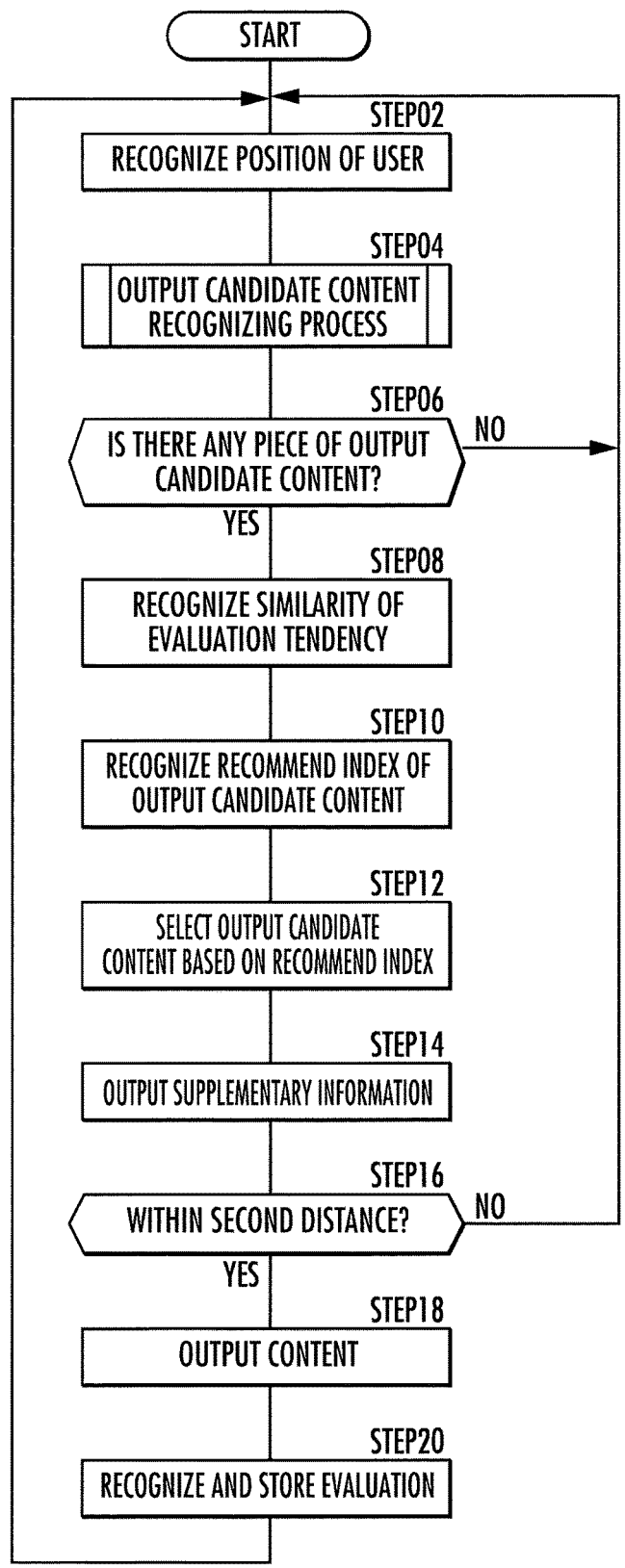
FIG. 5 is a flowchart of a content output control process.

The user state recognizing unit 211 recognizes the position of the client 2 (the position of the user X0) on the basis of the output of a GPS sensor or the like, and stores the position in the client storing unit 22 (FIG. 5/STEP02).

The client computation processor 21 executes an output candidate content recognizing process, described later (FIG. 5/STEP04). According to the output candidate content recognizing process, a content ID is recognized. The content ID is contained in a first area A and corresponds to the content positions CP1 and CP2. The first area A extends in a movement direction V of the user X0 with reference to the current position of the user X0 shown in FIG. 6, and is within a first distance from the position of the user.

Alternatively, the server computation processor 11 may recognize the content ID contained in the area A on the basis of area information received from the client 2 and transmit the content ID to the client 2, thereby allowing the content information 122 to recognize the output candidate content ID corresponding to the content position contained in the area A.

The content recognizing unit 212 may receive content from a communication device residing within a short distance, and store the content in the client storing unit 22.

The content output controller 213 determines whether one or more pieces of output candidate content have been recognized or not (FIG. 5/STEP06).

When the determination result is negative (FIG. 5/STEP06...NO), the content output controller 213 executes the processes in and after FIG. 5/STEP02.

When the determination result is affirmative (FIG. 5/STEP06...YES), the content output controller 213 recognizes the similarity between an evaluation tendency for the content by the user X0 of the client 2 and the evaluation tendency for the content by another user $X_i$ ($i=1$ to n) (FIG. 5/STEP08).

For example, the content output controller 213 calculates the similarity $ST_i$ with respect to each user $X_i$ on the basis of the evaluation information 123 received from the server 1 according to the following Expression (1).

[Expression 1]

$$STi = \frac{1}{1 + \sum_{j=1}^{m}(E_j = D_j)^2} \quad (1)$$

where
Ej: evaluation for content Yj by user X0.
Dj: evaluation for content Yj by user Xi.
Ej≠Null and Dj≠Null
STi: similarity of evaluation tendency by each user Xi with respect to evaluation tendency of user X0.

Here, the denominator of Expression (1) is at least one. Consequently, the similarity STi has a value larger than zero and not larger than one.

When the evaluation tendencies of the users X0 and Xi are similar to each other, that is, when many of the values of Ej and Dj are the same, the second term of the denominator of Expression (1) is zero or has a relatively small value. As a result, the denominator of Expression (1) has a relatively small value. Consequently, the similarity STi is one or has a value close to one. On the contrary, when the evaluation tendencies of the users X0 and Xi are largely different from each other, that is, when many of the values of Ej and Dj are different, the second term of the denominator of Expression (1) has a relatively large value. As a result, the denominator of Expression (1) is relatively large. Consequently, the similarity STi has a value close to zero.

In a case of multiple types of evaluations, the similarity STi may be calculated for each type of evaluation according to Expression (1), and the highest similarity STi may be adopted. Alternatively, Expression (1) may be deformed so as to calculate the expression of the second term of the denominator of Expression (1) for each type.

The content output controller 213 recognizes the recommend index N of the output candidate content Yj for the user X0 (FIG. 5/STEP10).

[Expression 2]

$$Rj = \frac{1}{1 + \Delta Lj * \alpha} * \sum_{i=1}^{n}(STi * Uij * Bi) \quad (2)$$

where
Rj: recommend index of content Yj for user X0
ΔLj: distance between content position of content Yj and current position of user X0
α: correction coefficient larger than zero
Uij: evaluation of content Yj by user Xi (only value other than Null)
Bi: value representing relationship of user Xi with X0 having a value at least zero In the SNS, there is a possibility that the user Xi posts a comment which highly positively evaluates the content and the user X0 views the comment to thereby cause the user X0 to be interested in the content highly positively evaluated by the user Xi. In a case where the user Xi is a user having a specifically strong relationship with the user X0, there is a high probability that the user X0 is also interested in the content highly positively evaluated by the user Xi. The coefficient to reflect such relationship between the users X0 and Xi in the recommend index is the correction coefficient Bi.

The correction coefficient Bi is a coefficient which is zero or more. More specifically, this coefficient is set to have a high value (e.g., 2) in the user information 121 shown in FIG. 2, in a case where the users X0 and Xi are friends (having a designated relationship) (a case where the user ID of the user Xi is in the friend column 1213 of the user X0).

This coefficient is set to have a medium value (e.g., 1.25), in a case where the users X0 and Xi are friends of a friend (a case where the user ID of the user Xi is not in the friend column 1213 of the user X0 but the logical sum of the friend column 1213 of the user X0 and the friend column 1213 of the user X0 is not empty) and the disclosure range of the user Xi is up to friends of a friend.

This coefficient is set to have a low value (e.g., one), in a case where the users X0 and Xi are not friends and are not friends of a friend either, that is, a case where the relationship between the users X0 and Xi is low. In the case where the relationship between the users X0 and Xi is low, Bi may be set to zero.

The correction coefficient Bi may be set in further detail on the basis of the mutual evaluations for the posts by the users X0 and Xi.

In addition to or instead of the friend relationship, any of love relationship, family relationship, classmate relationship, colleague relationship and the like may be adopted as the designated relationship.

According to Expression (2), the higher the correction coefficient Bi is, that is, the deeper the relationship between the users X0 and Xi is, the higher the recommend index Rj of the content Yj evaluated by the user Xi is.

According to Expression (2), the higher the similarity STi of the evaluation tendency is, that is, the more similar the evaluation tendency by the user X0 and the evaluation tendency by the user Xi are, the higher the recommend index Rj of the content Yj evaluated by the user Xi is.

According to Expression (2), the larger the distance ΔLj between the position of the user X0 and the content position of the content Yj is, the lower the recommend index Rj is.

The content output controller 213 may remove the amount of storage of the client storing unit 22 for the content by removing, from the client storing unit 22, pieces of content having recommend index Rj equal to or lower than a predetermined value.

The content output controller 213 may calculate the recommend index Rj according to the following Expression (3), for example.

[Expression 3]

$$Rj = \sum_{i=1}^{n}(STi * Uij * Bi) \quad (3)$$

The content output controller 213 may calculate the recommend index Rj according to the following Expression (4), for example.

[Expression 4]

$$Rj = \frac{1}{1 + \Delta Lj * \alpha} * \sum_{i=1}^{n}(STi * Uij) \quad (4)$$

The content output controller 213 may calculate the recommend index Rj according to the following Expression (5), for example.

[Expression 5]

$$Rj = \frac{1}{1 + \Delta Lj * \alpha} * \sum_{i=1}^{n} (Uij * Bi) \quad (5)$$

The content output controller 213 may calculate the average value of evaluations Uij for the content Yj, as the recommend index N.

The content output controller 213 selects the output candidate content on the basis of the recommend index Rj (j=1 to m) (FIG. 5/STEP12).

For example, the content output controller 213 may adopt the pieces of content having the highest five content indices in the descending order of the indices among the pieces of output candidate content, as the pieces of output candidate content.

The content output controller 213 outputs supplementary information on the output candidate content to the output unit 25 (FIG. 5/STEP14). The supplementary information on the output candidate content is information which relates to the output candidate content and has a smaller amount of information than the content has. The supplementary information on the output candidate content is, for example, information extracted from the output candidate content or information added to the output candidate content.

Figure 7:
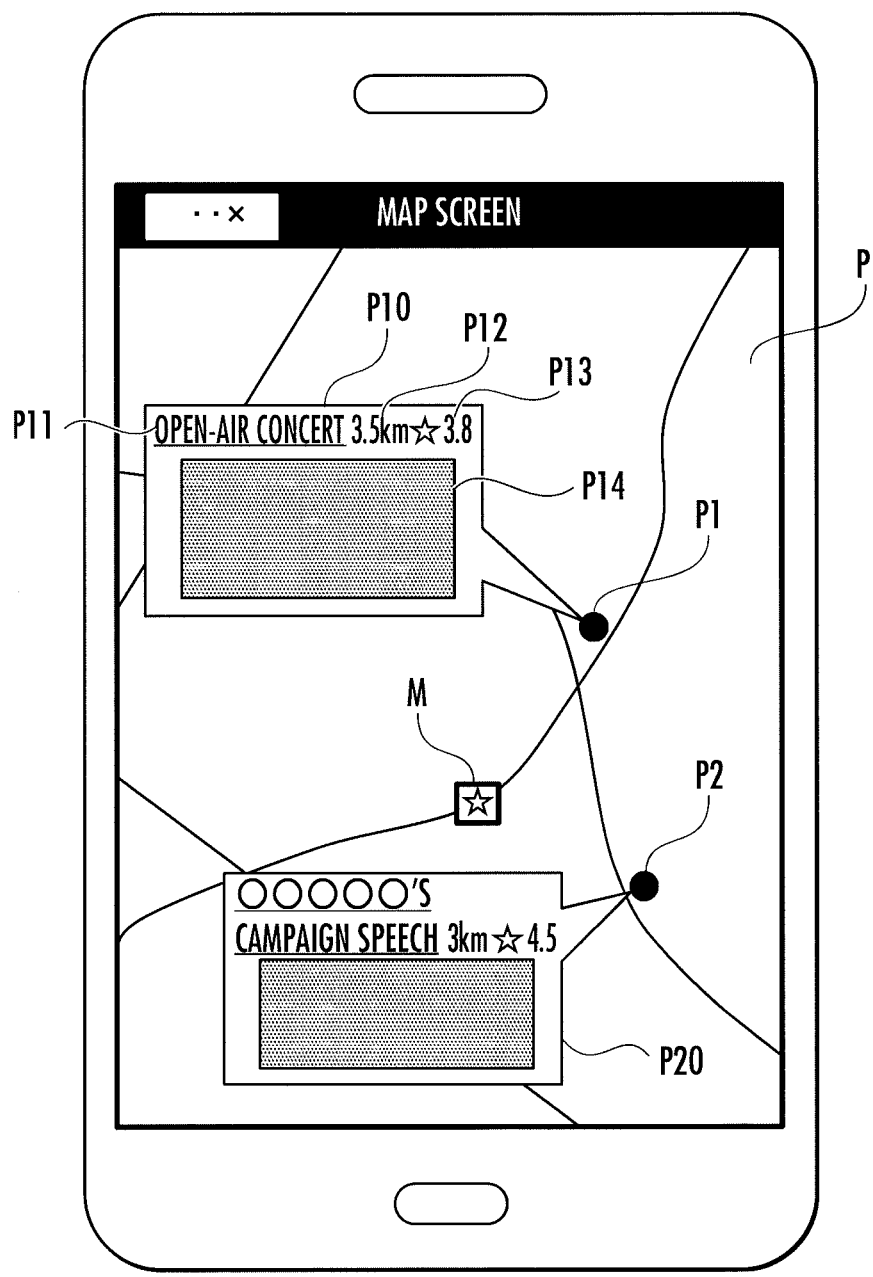
FIG. 7 is a diagram illustrating a configuration of a navigation screen.

For example, as shown in FIG. 7, the content output controller 213 displays content supplementary information displays P10 and P20 containing respective pieces of supplementary information associated with a first content position P1 and a second content position P2 in an overlapping manner on a navigation screen P where an icon M indicating the current position of the user and the client map information displayed in an overlapping manner, and outputs the displays to the output unit 25.

The content supplementary information display P10 contains, for example, a content title display P11, a display P12 of the distance to the content position, a display P13 of the number of content evaluators, and a content image display P14. Instead of or in addition to the content supplementary information display P10, an audio as content supplementary information may be output. When the content supplementary information display P10 is displayed, for example, a lamp or the like included in the client may light up or flash on and off.

The content output controller 213 may recognize the content information 122 by communicating with the server 1 via the client communication unit 23, and create the content supplementary information display P10 on the basis of the content information 122. Alternatively, this controller may receive a file containing the content supplementary information display P10 created by the server 1, and output the file to the output unit 25.

The supplementary information may contain content poster information, and information intrinsic to the poster, such as the vehicle type of a vehicle which is a mobile unit used by the content poster. The supplementary information may contain an abstract created by analyzing the post information.

The content output controller 213 may display the content supplementary information display P10 only for a predetermined time (e.g., 10 seconds). Alternatively, this controller may continue to display the content supplementary information display P10 until an affirmative determination is achieved in FIG. 5/STEP16, described later, and stop displaying the content supplementary information display P10 after the affirmative determination is achieved in FIG. 5/STEP16. Alternatively, this controller may continue displaying the content supplementary information display P10 until the affirmative determination is achieved in FIG. 5/STEP16, described later, and output the content supplementary information display P10 together with the content after the affirmative determination is achieved in FIG. 5/STEP16.

The content output controller 213 determines whether any piece of content having the distance between the content position and the position of the user X0 is within a second distance shorter than the first distance or not (FIG. 5/STEP16).

The case where the distance between the content position and the position of the user X0 is within the second distance corresponds to "the case where the relative positional relationship between the user and the output candidate content satisfies a predetermined second condition" of the present invention. Instead of or in addition to this, it may be determined that "the relative positional relationship between the user and the output candidate content satisfies the predetermined second condition" when a positional relationship is achieved where the content position is in a second area in a predetermined direction determined on the basis of the movement direction of the user X. Here, the second area is an area contained in the first area.

When the determination result is negative (FIG. 5/STEP16. . .NO), the content output controller 213 executes the processes in and after FIG. 5/STEP02.

When the determination result is affirmative (FIG. 5/STEP16 . . . YES), the content output controller 213 outputs, to the output unit 25, the pieces of content having the distance between the content position and the position of the user X0 is within the second distance (FIG. 5/STEP18).

Figure 8:
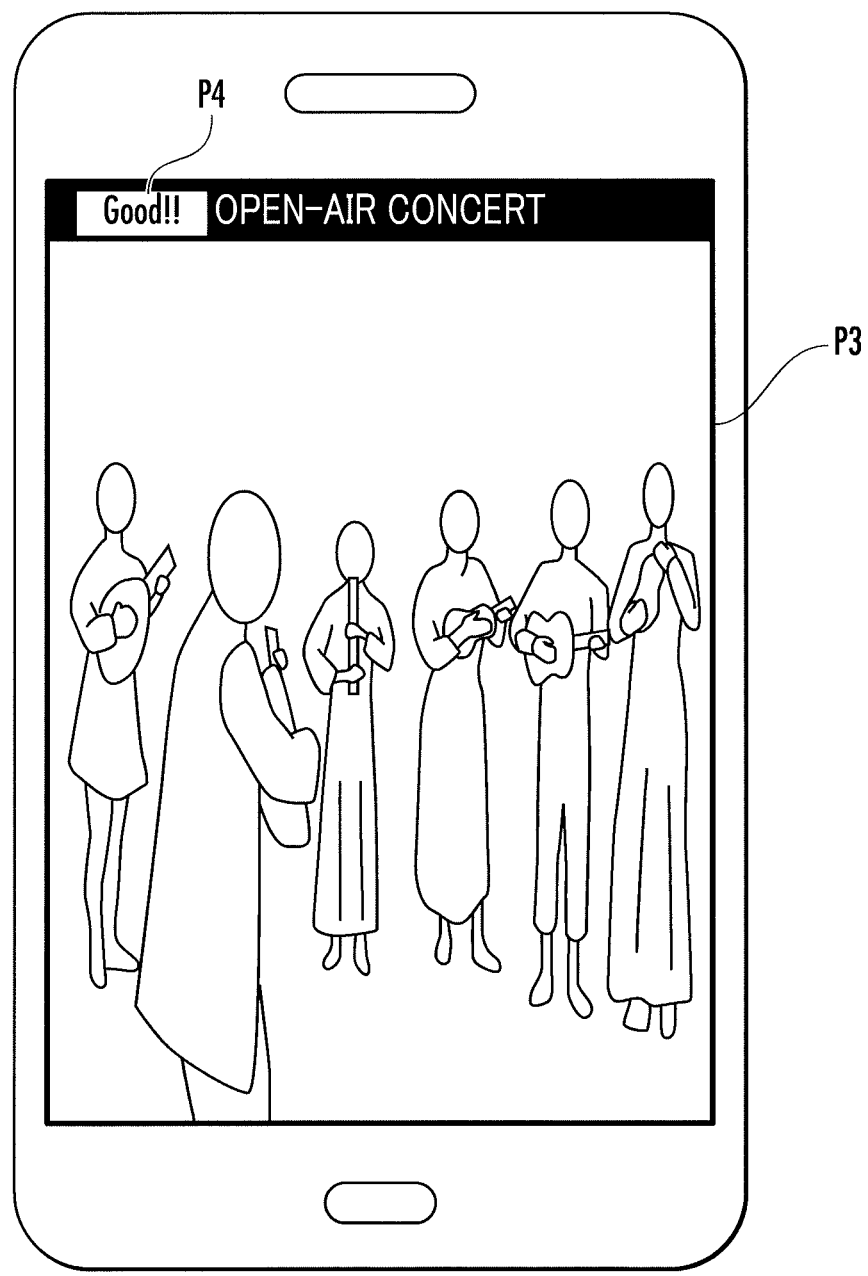
FIG. 8 is a diagram illustrating moving image pertaining to an open-air concert, which is content.

For example, as shown in FIG. 8, the content output controller 213 outputs a moving image P3 pertaining to an open-air concert as content, and an image containing a Good button P4 for evaluating the content, to the output unit 25.

To output the content, the content output controller 213 may recognize the locator column 1226 of the content contained in the content information 122 through communication with the server 1, and obtain the content on the basis of the value of the locator column 1226. Alternatively, this controller may receive the content from the server 1. The content output controller 213 may reproduce the content which has been preliminarily received from each communication device residing within a short distance and stored in the client storing unit 22.

When the content output controller 213 detects, through the input unit 24, a pressing operation on a Good button provided for a steering wheel, a pressing operation on a Good button displayed on the output unit 25, or an affirmative statement about the output content, this controller transmits the affirmative evaluation by the user X0 for the output content to the server 1 through the client communication unit 23, and causes the server storing unit 12 to store the evaluation (FIG. 5/STEP20).

The content output controller 213 starts executing the content output control process in the next period.

(Output Candidate Content Recognizing Process)

Referring to FIG. 9, the details of the output candidate content recognizing process in FIG. 5/STEP04 are described.

The user state recognizing unit 211 calculates a current average direction vector AP(t) of the user X0 (FIG. 9/STEP32).

For example, the user state recognizing unit 211 calculates the current average direction vector AP(t) according to Expression (6).

[Expression 6]

$$AP(t)=AP(t-1)*(1-s)+Po\ int(t)*s \qquad (6)$$

where
t: time variable representing the current time
s: coefficient 0<s<1
Point(t): vector representing current position of user X0
AP(t−1): average direction vector calculated in FIG. 9/STEP32 last time
AP(t): average direction vector calculated FIG. 9/STEP32 this time
Note that AP(0) is direction of road on map at Point(0)

The current average direction vector AP(t) represents the movement direction V of the user X0 estimated on the basis of the temporal average of movement trajectory after start of movement (see FIG. 6).

The content recognizing unit 212 calculates a vector obtained by rotating the current average direction vector AP(t) by a predetermined angle φ (FIG. 9/STEP34). In the following description, the vectors obtained by rotating the vector AP(t) in the current average direction by the predetermined φ are simply represented as boundary vectors AP(t)+α and AP(t)−α.

The content recognizing unit 212 calculates a vector YVj (hereinafter called a content vector YVj) formed by the current position of the user X0 and the content position of the content Yj having not been output (FIG. 9/STEP34).

More specifically, the content recognizing unit 212 recognizes the evaluation information 123 (see FIG. 4) through communication with the server 1, and recognizes the content Yj having an evaluation of the user X0 being Null (having not been output). The content recognizing unit 212 recognizes the content information 122 (see FIG. 3) through communication with the server 1, and recognizes the position of the content Yj having not been output. The content recognizing unit 212 calculates the content vector YVj formed by the current position of the user X0 and the content position of the content Yj having not been output on the basis of the position of the user X0 recognized in FIG. 5/STEP02 and the position of the content Yj having not been output.

The content recognizing unit 212 determines whether or not the content vector YVj is contained in the first area A which is formed by the boundary vectors AP(t)+α and AP(t)−α and contains the average direction vector AP(t) (FIG. 9/STEP38).

When the determination result is affirmative (FIG. 9/STEP38 . . . YES), the content recognizing unit 212 calculates the distance between the current position of the user X0 and the content position of the content Yj (FIG. 9/STEP40).

The content recognizing unit 212 determines whether or not the distance between the current position of the user X0 and the content position of the content Yj is within the first distance (FIG. 9/STEP42).

The case where the content position is contained in the first area A and the distance between the content position and the position of the user X0 is within the first distance corresponds to "the case where the relative positional relationship between the user and the output candidate content satisfies a predetermined first condition" of the present invention. Alternatively, it may be determined "the relative positional relationship between the user and the output candidate content satisfies a predetermined first condition", in a case where any one of the fact that the content position is contained in the first area A and the fact that the distance between the content position and the position of the user X0 is within the first distance is satisfied.

When the determination result is affirmative (FIG. 9/STEP42 . . . YES), the content recognizing unit 212 recognizes the content Yj as the output candidate content (FIG. 9/STEP44). The content Yj is content having a content position contained in the area A shown in FIG. 6.

When the determination result in FIG. 9/STEP38 is negative (FIG. 9/STEP38. . .NO) or the determination result in FIG. 9/STEP42 is negative (FIG. 9/STEP42. . .NO), the content recognizing unit 212 recognizes that the content Yj is not the output candidate content (FIG. 9/STEP46).

After the process in FIG. 9/STEP44, or after the process in FIG. 9/STEP46, the content recognizing unit 212 determines whether or not there is content having not been processed and not been output (FIG. 9/STEP48).

When the determination result is affirmative (FIG. 9/STEP48 . . . YES), the content recognizing unit 212 executes the processes in and after FIG. 9/STEP36.

When the determination result is negative (FIG. 9/STEP48. . .NO), the content recognizing unit 212 finishes the output candidate content recognizing process.

REFERENCE SIGNS LIST

1 . . . Server, 2 . . . Client, 25 . . . Output unit, 211 . . . User state recognizing unit, 212 . . . Content recognizing unit, and 213 . . . Content output controller.

What is claimed is:

1. A content output system, comprising:
an output unit configured to output information;
a user state recognizing unit configured to recognize a position of a user;
a content recognizing unit configured to recognize a content, a content position which is a position associated with the content, and an evaluation by the user for the content; and
a content output controller configured to select content to be output, based on a positional relationship between the user and the content, and an evaluation by a user different from the user for each piece of content,
wherein the content output controller selects a content to be output, among one or a plurality of contents having not been output to the user, based on a similarity between an evaluation tendency by the user and an evaluation tendency by another user, and the evaluation by the other user for the pieces of content having not been output.

2. A content output system, comprising:
an output unit configured to output information;
a user state recognizing unit configured to recognize a position of a user;
a content recognizing unit configured to recognize a content, a content position which is a position associated with the content, and an evaluation by the user for the content; and
a content output controller configured to select content to be output, based on a positional relationship between the user and the content, and an evaluation by a user different from the user for each piece of content,
wherein the content output controller outputs a content having a high evaluation by a related user having a designated relationship with the user, among one or the plurality of contents having not been output to the user, with a higher priority than a content of which the evaluation is low.

3. The content output system according to claim 1, the content recognizing unit recognizes a position where the content is obtained, as the content position, and wherein the content output controller outputs a content where the position of the user and the content position are near to each other, with a higher priority than a piece of content where the position of the user and the content position are far from each other.

* * * * *